United States Patent
Tsai et al.

(10) Patent No.: US 10,809,831 B2
(45) Date of Patent: Oct. 20, 2020

(54) BIOMETRIC-RECOGNITION DISPLAY PANEL

(71) Applicant: InnoLux Corporation, Miao-Li County (TW)

(72) Inventors: Chia-Hao Tsai, Miao-Li County (TW); Yi-Shiuan Cherng, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/715,207

(22) Filed: Sep. 26, 2017

(65) Prior Publication Data

US 2018/0101271 A1     Apr. 12, 2018

(30) Foreign Application Priority Data

Oct. 11, 2016 (CN) .......................... 2016 1 0886324

(51) Int. Cl.
| | |
|---|---|
| *G06F 3/041* | (2006.01) |
| *G06F 3/042* | (2006.01) |
| *G09G 3/32* | (2016.01) |
| *G06F 3/044* | (2006.01) |

(52) U.S. Cl.
CPC ............ *G06F 3/0412* (2013.01); *G06F 3/042* (2013.01); *G06F 3/044* (2013.01); *G06F 3/0416* (2013.01); *G09G 3/32* (2013.01)

(58) Field of Classification Search
CPC ...... G06F 3/0412; G06F 3/042; G06F 3/0423; G06F 3/0416; G06F 3/32; G06F 3/044
See application file for complete search history.

(56) References Cited

U.S. PATENT DOCUMENTS

| | | | |
|---|---|---|---|
| 6,795,049 | B2 | 9/2004 | Toyoshima et al. |
| 9,310,915 | B2 | 4/2016 | Kurokawa |
| 9,316,695 | B2 | 4/2016 | Takahashi et al. |
| 9,704,011 | B2 | 7/2017 | Yang et al. |
| 9,740,910 | B2 | 8/2017 | Yang et al. |

(Continued)

FOREIGN PATENT DOCUMENTS

| | | | |
|---|---|---|---|
| CN | 1366284 | A | 8/2002 |
| CN | 1726505 | A | 1/2006 |

(Continued)

OTHER PUBLICATIONS

CN Office Action dated Aug. 23, 2019 for the corresponding application No. 201710748853.7 in China, pp. 1-9.

(Continued)

*Primary Examiner* — Jimmy H Nguyen

(74) *Attorney, Agent, or Firm* — McClure, Qualey & Rodack, LLP

(57) ABSTRACT

A biometric-recognition display panel is provided. The biometric-recognition display panel includes a substrate, a pixel array, a plurality of sensing circuits and a control circuit. The substrate includes a display area. The pixel array is disposed on the display area and the pixel array includes a plurality of pixels. The sensing circuits are disposed on the display area and each of the sensing circuits generates a threshold voltage by sensing the intensity of light. The control circuit performs biometric recognition according to each of the threshold voltages generated by each of the sensing circuits.

5 Claims, 8 Drawing Sheets

(56) References Cited

U.S. PATENT DOCUMENTS

| | | | |
|---|---|---|---|
| 2005/0249388 A1 | 11/2005 | Linares | |
| 2007/0109239 A1* | 5/2007 | den Boer | G02F 1/13338 345/87 |
| 2014/0192023 A1* | 7/2014 | Hoffman | G06F 3/0423 345/175 |
| 2014/0198092 A1* | 7/2014 | Azizi | G09G 3/006 345/212 |
| 2014/0354597 A1* | 12/2014 | Kitchens, II | G06F 1/3215 345/175 |
| 2017/0199606 A1* | 7/2017 | Liu | G06F 3/0412 |
| 2017/0206843 A1 | 7/2017 | Liu et al. | |
| 2017/0371213 A1 | 12/2017 | Wang et al. | |

FOREIGN PATENT DOCUMENTS

| | | |
|---|---|---|
| CN | 102265244 A | 11/2011 |
| CN | 103913707 A | 7/2014 |
| CN | 104155785 A | 11/2014 |
| CN | 104200768 A | 12/2014 |
| CN | 104898322 A | 9/2015 |
| CN | 105139793 A | 12/2015 |
| CN | 105930827 A | 9/2016 |
| WO | 2004/057523 A1 | 7/2004 |

OTHER PUBLICATIONS

Chinese language office action dated Jul. 20, 2020, issued in application No. CN 201710748853.7.

\* cited by examiner

BIOMETRIC-RECOGNITION DISPLAY PANEL

CROSS REFERENCE TO RELATED APPLICATIONS

This Application claims priority of China Patent Application No. 201610886324.9, filed on Oct. 11, 2016, the entirety of which is incorporated by reference herein.

BACKGROUND OF THE INVENTION

Field of the Invention

The disclosure generally relates to biometric-recognition display panel technology, and more particularly, to display panel technology used for configuring a sensing circuit in a pixel of the display panel for fingerprint-recognition.

Description of the Related Art

In a traditional display panel, if a sensing circuit for biometric recognition is configured in the array of the display panel by a capacitive touch method, it may be difficulty for the output signal to be recognized because the sensing electrode of the sensing circuit is too small or the distance between the sensing circuit and the finger is too far. Therefore, an expensive customized chip needs to be used to process the output signal of the sensing circuit.

BRIEF SUMMARY OF THE INVENTION

A biometric-recognition display panel is provided to reduce the problem mentioned above by configuring a sensing circuit in a pixel of the display panel for biometric recognition.

An embodiment of the disclosure provides a biometric-recognition display panel. The biometric-recognition display panel comprises a substrate, a pixel array, a plurality of sensing circuits, and a control circuit. The substrate comprises a display area. The pixel array is disposed on the display area and the pixel array comprises a plurality of pixels. The sensing circuits are disposed on the display area and each of the sensing circuits generates a threshold voltage by sensing the intensity of light. The control circuit performs biometric recognition according to each of the threshold voltages generated by each of the sensing circuits.

Other aspects and features of the disclosure will become apparent to those with ordinary skill in the art upon review of the following descriptions of specific embodiments of the biometric-recognition display panel.

BRIEF DESCRIPTION OF THE DRAWINGS

The disclosure will become more fully understood by referring to the following detailed description with reference to the accompanying drawings, wherein.

DETAILED DESCRIPTION OF THE INVENTION

The following description discloses some embodiments. This description is made for the purpose of illustrating the general principles of the disclosure and should not be taken in a limiting sense. The scope of the disclosure is determined by reference to the appended claims.

Figure 1:
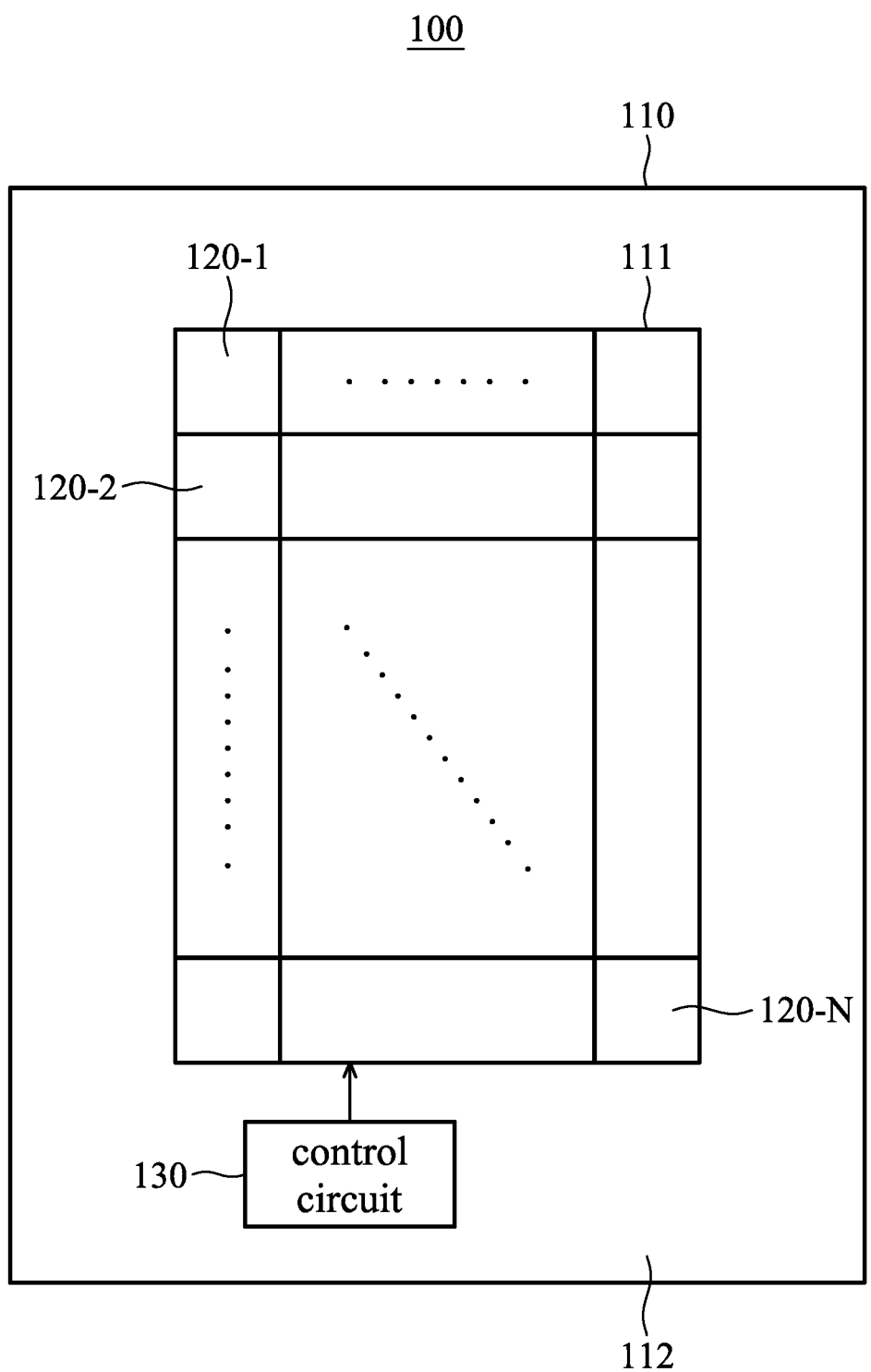
FIG. 1 is a schematic diagram of a biometric-recognition display panel 100 according to an embodiment of the disclosure.

FIG. 1 is a schematic diagram of a biometric-recognition display panel 100 (hereinafter referred to simply as display panel 100) according to an embodiment of the disclosure. The display panel 100 may be a touch display. According to the embodiments of the disclosure, the display panel 100 may be applied to a liquid-crystal display (LCD), an organic light-emitting diode display (OLED display), a micro LED display, or a quantum dot display, and the disclosure is not limited thereto. The biometric-recognition display panel 100 could be used to detect the biometric character, such as fingerprint, but the disclosure is not limited thereto.

As shown in FIG. 1, the display panel 100 comprises a substrate 110, a plurality of pixels 120-1, 120-2 . . . 120-N and a controller. Note that, in order to clarify the concept of the disclosure, FIG. 1 presents a simplified diagram in which only the elements relevant to the disclosure are shown. However, the disclosure should not be limited to what is shown in FIG. 1.

As shown in FIG. 1, the substrate 110 comprises a display area 111 and a non-display area 112, wherein the non-display area 112 is disposed around the display area 111. In another embodiment of the disclosure, the non-display area 112 is located next to the display area 111 rather than limited to being disposed around the display area 111. In another embodiment of the disclosure, the substrate 110 may only comprise a display area 111. In the display area 111, the pixels 120-1, 120-2 . . . 120-N, a plurality of scan lines (or gate lines) (not shown in figure), a plurality of data lines (not shown in figure) and a plurality of sensing circuits (not shown in figure).

The scan lines extend along a first direction (e.g. the row direction), and the data lines extend along a second direction (e.g. the column direction) such that the gate lines and data lines are perpendicular to each other. The first direction is different from the second direction. In an embodiment of the disclosure, the first direction is perpendicular to the second direction. The pixels 120-1, 120-2 . . . 120-N are disposed in a matrix. Specifically, the pixels 120-1, 120-2 . . . 120-N are disposed along the first direction and the second direction to construct a pixel matrix. Each of pixels 120-1, 120-2 . . . 120-N comprises a plurality of sub-pixel (e.g. RGB sub-pixel, RGBW sub-pixel and so on). In an embodiment of the disclosure, the substrate 110 further comprises a scan driver and a data driver. The scan driver is coupled to the scan lines, and the data driver is coupled to the data lines.

The sensing circuits comprise thin-film transistor (TFT) elements. In an embodiment of the disclosure, each of the sensing circuits corresponds to one of the pixels 120-1, 120-2 . . . 120-N. In another embodiment of the disclosure, the sensing circuits correspond to the pixels in a particular area. That is to say, the sensing circuits may be configured in a particular area of the display area 111. In an embodiment of the disclosure, the sensing circuit may be configured in any one of the sub-pixels of the pixel corresponding to the sensing circuit. In another embodiment of the disclosure, the sensing circuit may be configured outside the sub-pixels of the pixel corresponding to the sensing circuit. In another embodiment of the disclosure, the sensing circuit may be configured in all of the sub-pixels of the pixel corresponding to the sensing circuit, wherein the definition of "configuring in" means the sensing circuit is included in one of sub-pixels of the pixel, and the definition of "configuring outside" means the sensing circuit is in the periphery region of sub-pixels of the pixel.

In an embodiment of the disclosure, the control circuit 130 may be a control chip or a circuit configured in the substrate, and the control circuit 130 may drive the pixels and sensing circuits. When the pixel is driven, the display panel 100 may perform a normal display function. When the sensing device is driven, the sensing device may have a different threshold voltage Vth according to the difference in the intensity of the sensed light. The control circuit 130 performs biometric-recognition according to the different threshold voltages Vth of different sensing circuits. The details will be discussed below.

In an embodiment of the disclosure, each pixel and its corresponding sensing circuit are coupled to the same scan line. That is to say, the sensing circuit and its corresponding pixel are driven by the same scan line. Therefore, in this embodiment of the disclosure, the control circuit 130 may drive the sensing device and its corresponding pixel at the same time (i.e. the operations of displaying and sensing are performed at the same time), but an independent data line needs to be configured for the sensing circuit (i.e. the data line is not shared with the pixel) to independently read the data generated by the sensing circuit.

In another embodiment of the disclosure, each pixel and its corresponding sensing circuit are coupled to a different respective scan line. In this embodiment of the disclosure, the control circuit 130 may drive the sensing device and its corresponding pixel at the same time, but an independent data line needs to be configured for the sensing circuit to independently read the data generated by the sensing circuit. In addition, in this embodiment of the disclosure, the control circuit 130 may also drive the sensing device and its corresponding pixel at different time (i.e. when the sensing circuit is driven, the pixel will be closed), wherein in this situation, the sensing circuit can share the data line with its corresponding pixel, or an independent data line may also be configured for the sensing circuit.

When the control circuit 130 drives the pixels or sensing circuits, the control circuit may drive the pixels or sensing circuits in each row in order. That is to say, when the data generated by the pixels or sensing circuits in one row has been read, the control circuit 130 drives the pixels or sensing circuits in the next row. The details of the configurations of the sensing circuit will be discussed below.

Figure 2:
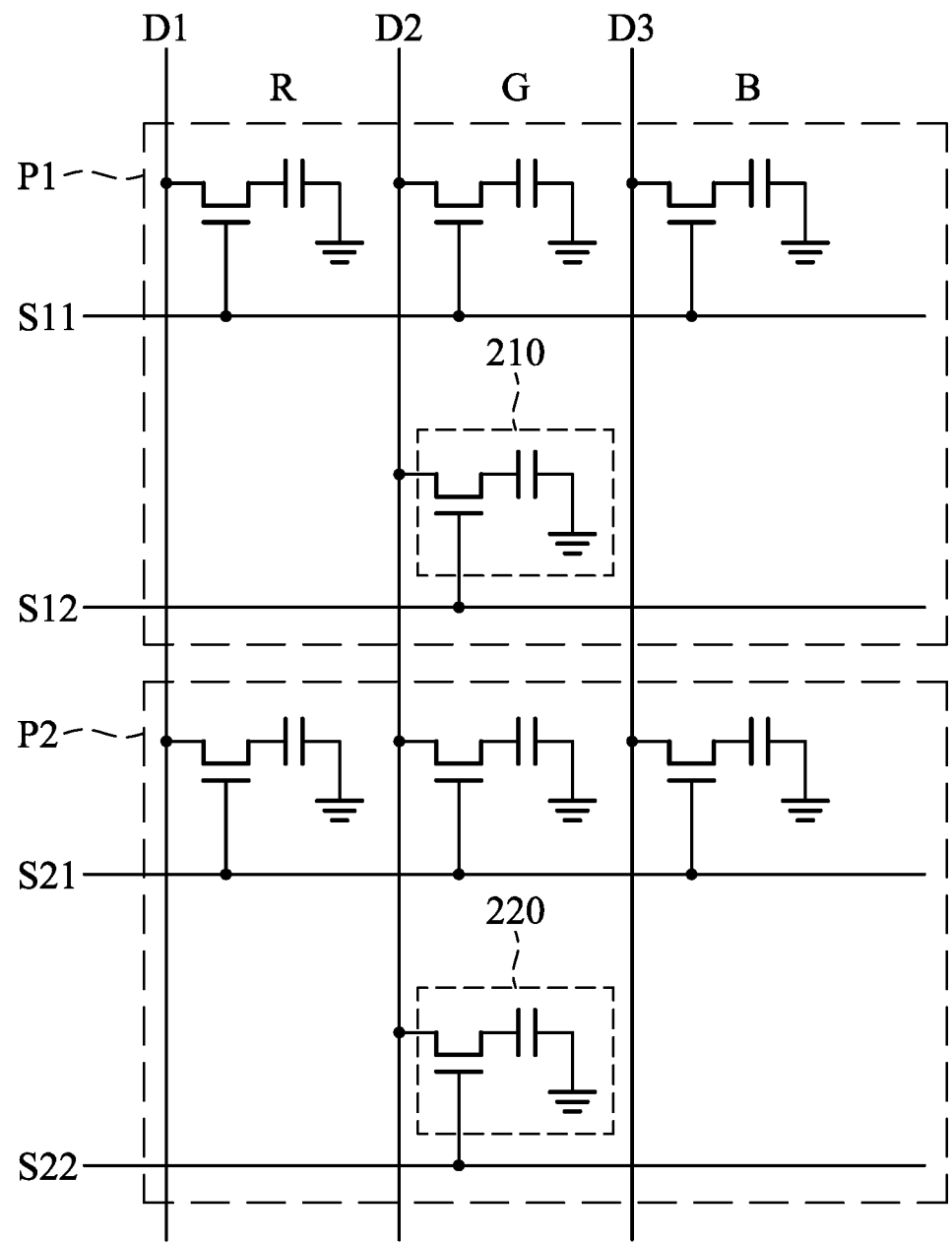
FIG. 2 is a schematic diagram of a configuration of the sensing circuits according to an embodiment of the disclosure.

FIG. 2 is a schematic diagram of a configuration of the sensing circuits according to an embodiment of the disclosure. In this embodiment of the disclosure, the sensing circuit 210 and the sensing circuit 220 are applied to the non-self-luminous display (e.g. LCD). That is to say, the light source of the sensing circuit 210 and the sensing circuit 220 is generated by the back light module of the display panel. As shown in FIG. 2, the sensing circuit 210 is configured in the sub-pixel G of the pixel P1, and the sensing circuit 220 is configured in the sub-pixel G of the pixel P2. Different scan lines S11 and S12 are configured to the sub-pixels RGB of pixel P1 and the sensing circuit 210, and the sensing circuit 210 shares the data line D2 with the sub-pixel G of the pixel P1. Different scan lines S21 and S22 are configured to the sub-pixels RGB of pixel P2 and the sensing circuit 220, and the sensing circuit 220 shares the data line D2 with the sub-pixel G of the pixel P2. Therefore, in the embodiment of the disclosure, the sub-pixels RGB of pixel P1 and the sensing circuit 210 are driven by the scan lines S11 and S12 respectively at different times, and sub-pixels RGB of pixel P2 and the sensing circuit 220 are driven by the scan lines S21 and S22 respectively at different times. Note that, in order to clarify the concept of the disclosure, FIG. 2 merely presents one embodiment of the disclosure. However, the disclosure should not be limited to what is shown in FIG. 2. In other embodiments of the disclosure, the sensing circuit 210 and the sensing circuit 220 may be configured in other sub-pixels (e.g. sub-pixel R or sub-pixel B). In other embodiments of the disclosure, the sensing circuit 210 may share the same scan line with the sub-pixels RGB of pixel P1 and the sensing circuit 220 may share the same scan line with the sub-pixels RGB of pixel P2, but an independent data line needs to be configured for the sensing circuits 210 and 220 to independently read the data generated by the sensing circuits 210 and 220. In other embodiments of the disclosure, if an independent data line is configured for the sensing circuits 210 and 220, the sensing circuit 210 and the sub-pixels RGB of pixel P1 may be driven by the respective scan lines S11 and S12 at the same time or at different times, and the sensing circuit 220 and the sub-pixels RGB of pixel P2 may be driven by the respective scan lines S21 and S22 at the same time or at different times.

Figure 3:
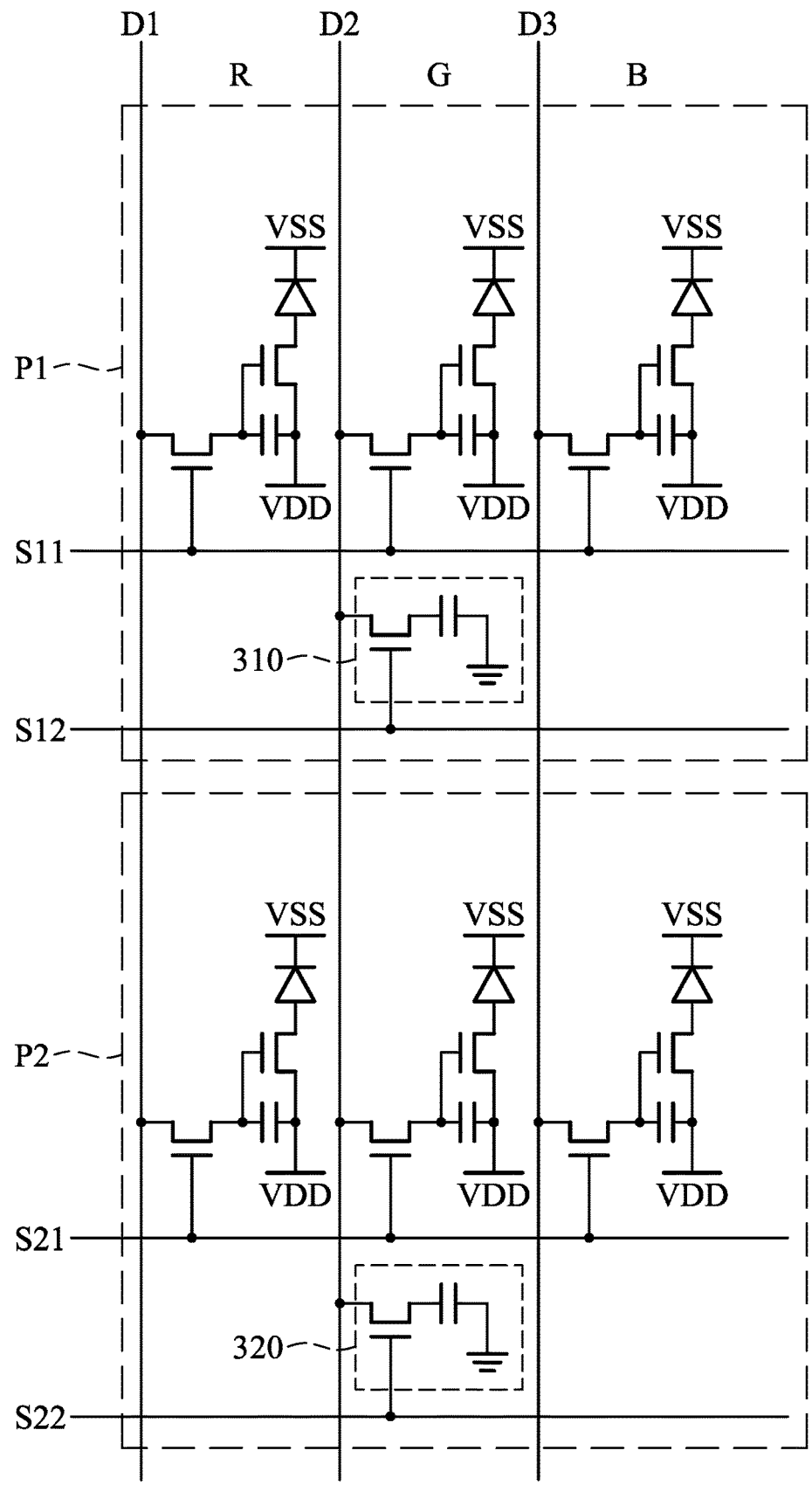
FIG. 3 is another schematic diagram of a configuration of the sensing circuits according to an embodiment of the disclosure.

FIG. 3 is a schematic diagram of a configuration of the sensing circuits according to another embodiment of the disclosure. In this embodiment of the disclosure, the sensing circuit 310 and the sensing circuit 320 are applied to the self-luminous display (e.g. OLED and Micro LED). That is to say, the light source of the sensing circuit 310 or the sensing circuit 320 is provided by the sub-pixels of the pixels or an independent light source. The independent light source may be an OLED or LED and the light generated by the light source may be one of visible light, ultraviolet light (UV), far infrared light (FIR), near infrared light (NIR) and so on. In the embodiment of the disclosure, the light sources of the sensing circuit 310 and the sensing circuit 320 are provided by the sub-pixels of the pixels. As shown in FIG. 3, the sensing circuit 310 is configured in the sub-pixel G of the pixel P1 and the sub-pixel G provides the light to the sensing circuit 310. The sensing circuit 320 is configured in the sub-pixel G of the pixel P2 and the sub-pixel G provides the light to the sensing circuit 320. Different scan lines S11 and S12 are respectively configured to the sub-pixels RGB of pixel P1 and the sensing circuit 310, and the sensing circuit 310 shares the data line D2 with the sub-pixel G of the pixel P1. Different scan lines S21 and S22 are respectively configured to the sub-pixels RGB of pixel P2 and the sensing circuit 320, and the sensing circuit 320 shares the data line D2 with the sub-pixel G of the pixel P2. Therefore, in the embodiment of the disclosure, the sub-pixels RGB of pixel P1 and the sensing circuit 310 are respectively driven by the scan lines S11 and S12 at different times, and sub-pixels RGB of pixel P2 and the sensing circuit 320 are respectively driven by the scan lines S21 and S22 at different times. Note that, in order to clarify the concept of the disclosure, FIG. 3 merely presents one embodiment of the disclosure. However, the disclosure should not be limited to what is shown in FIG. 3. In other embodiments of the disclosure, the sensing circuit 310 and the circuit 320 may be configured in other sub-pixels (e.g. sub-pixel R or sub-pixel B). In other embodiments of the disclosure, the sensing circuit 310 may share the same scan line with the sub-pixels RGB of pixel P1 and the sensing circuit 320 may share the same scan line with the sub-pixels RGB of pixel P2, but an independent data line needs to be configured for the sensing circuits 310 and 320 to independently read the data generated by the sensing circuits 310 and 320. In other embodiments of the disclosure, the light source of the sensing circuit 310 may be provided by the sub-pixel B or sub-pixel R of the pixel P1 and the light source of the sensing circuit 320 may be provided by the sub-pixel B or sub-pixel R of the pixel P2.

Figure 4:
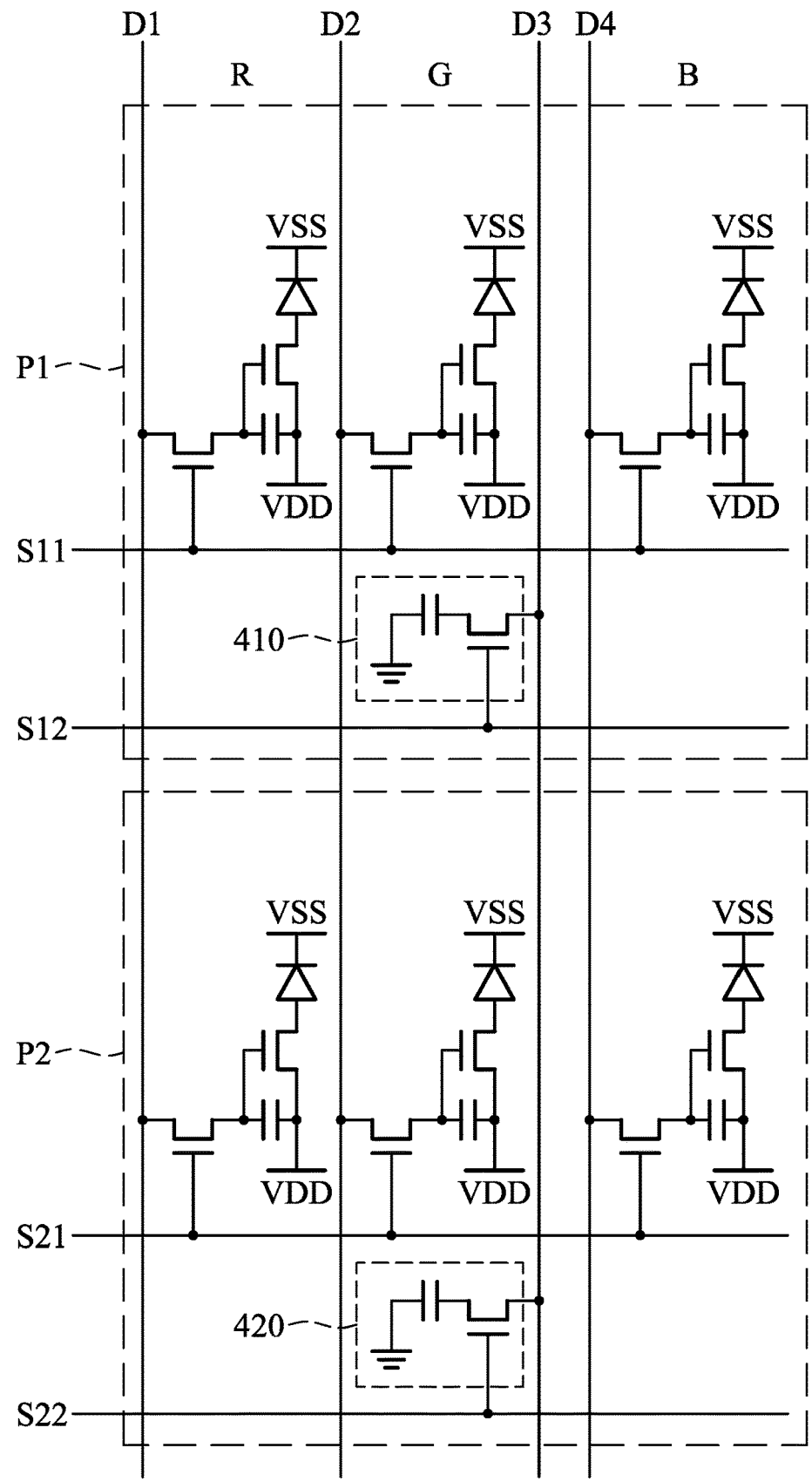
FIG. 4 is another schematic diagram of a configuration of the sensing circuits according to an embodiment of the disclosure.

FIG. 4 is a schematic diagram of a configuration of the sensing circuits according to another embodiment of the disclosure. In this embodiment of the disclosure, the sensing circuit 410 and the sensing circuit 420 are applied to the self-luminous display (e.g. OLED and Micro LED). That is to say, the light source of the sensing circuit 410 or the sensing circuit 420 is provided by the sub-pixels of the pixels or an independent light source. In the embodiment of the disclosure, the light sources of the sensing circuit 410 and the sensing circuit 420 are provided by the sub-pixels of the pixels. As shown in FIG. 4, the sensing circuit 410 is configured in the sub-pixel G of the pixel P1 and the sub-pixel G provides the light to the sensing circuit 410. The sensing circuit 420 is configured in the sub-pixel G of the pixel P2 and the sub-pixel G provides the light to the sensing circuit 420. Different scan lines S11 and S12 are respectively configured to the sub-pixels RGB of pixel P1 and the sensing circuit 410, and an independent data line D3 is configured to the sensing circuit 410. Different scan lines S21 and S22 are respectively configured to the sub-pixels RGB of pixel P2 and the sensing circuit 420, and an independent data line D3 is configured to the sensing circuit 420. Therefore, in the embodiment of the disclosure, the sub-pixels RGB of pixel P1 and the sensing circuit 410 may be respectively driven by the scan lines S11 and S12 at the same time or at different times, and sub-pixels RGB of pixel P2 and the sensing circuit 420 may be respectively driven by the scan lines S21 and S22 at the same time or at different times. Note that, in order to clarify the concept of the disclosure, FIG. 4 merely presents one embodiment of the disclosure. However, the disclosure should not be limited to what is shown in FIG. 4. In other embodiments of the disclosure, the sensing circuit 410 may share the same scan line with the sub-pixels RGB of pixel P1 and the sensing circuit 420 may share the same scan line with the sub-pixels RGB of pixel P2. In other embodiments of the disclosure, the light source of the sensing circuit 410 may be provided by the sub-pixel B or sub-pixel R of the pixel P1 and the light source of the sensing circuit 420 may be provided by the sub-pixel B or sub-pixel R of the pixel P2.

Figure 5:
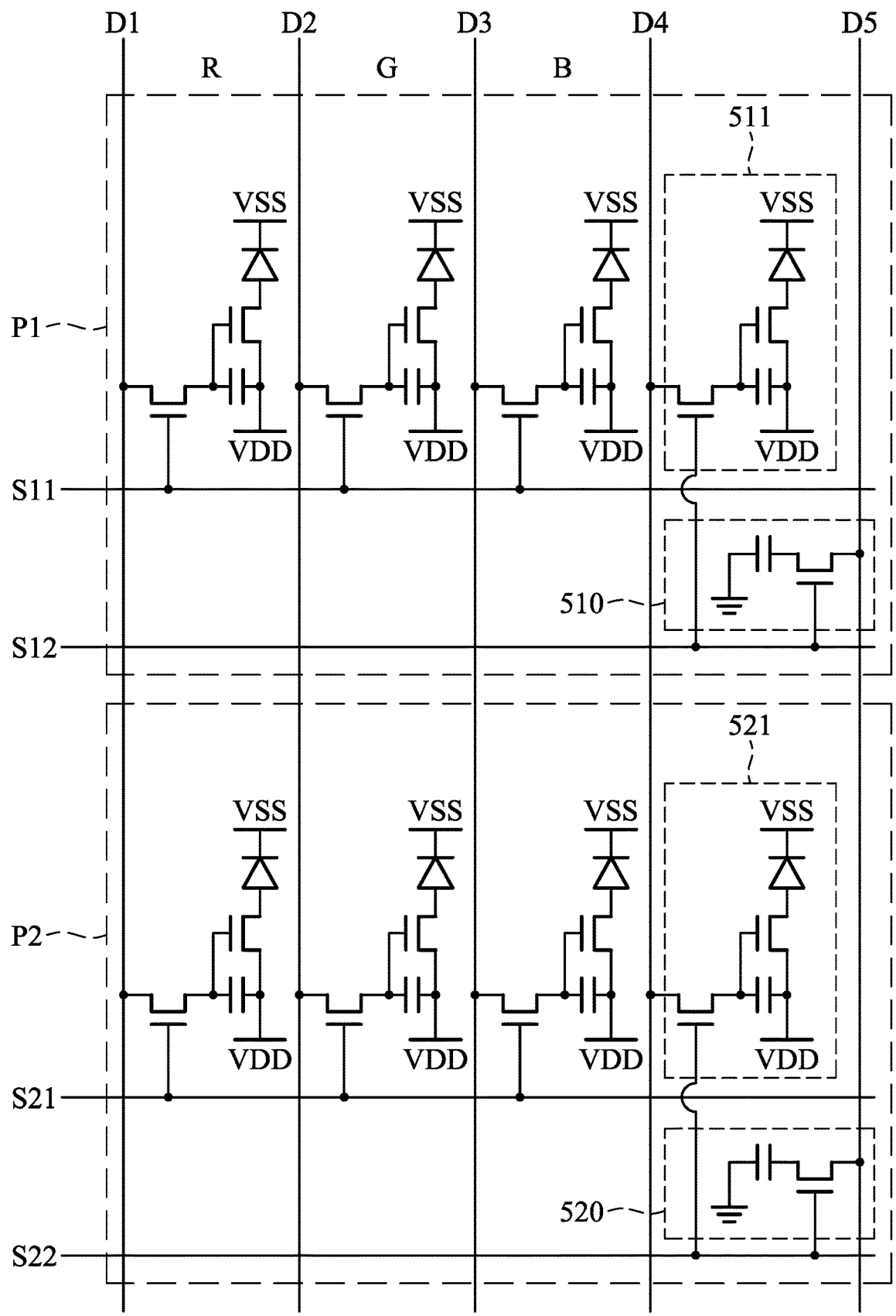
FIG. 5 is another schematic diagram of a configuration of the sensing circuits according to an embodiment of the disclosure.

FIG. 5 is a schematic diagram of a configuration of the sensing circuits according to another embodiment of the disclosure. In this embodiment of the disclosure, the sensing circuit 510 and the sensing circuit 520 are applied to the self-luminous display (e.g. OLED and Micro LED). That is to say, the light source of the sensing circuit 510 or the sensing circuit 520 is provided by the sub-pixels of the pixels or an independent light source. In the embodiment of the disclosure, the light source of the sensing circuit 510 or the sensing circuit 520 is provided by an independent light source, wherein the independent light source may be the OLED or LED and the light generated by the light source may be one of visible light, ultraviolet light (UV), far infrared light (FIR), near infrared light (NIR) and so on. As shown in FIG. 5, the sensing circuit 510 is configured outside the sub-pixels RGB of the pixel P1 and an independent light source circuit 511 provides the light to the sensing circuit 510. The sensing circuit 520 is configured outside the sub-pixels RGB of the pixel P2 and an independent light source circuit 521 provides the light to the sensing circuit 520. The scan line S11 is configured to the sub-pixels RGB of the pixel P1 and the scan line S12 is configured to the sensing circuit 510 and the independent light source circuit 511. The data line D5 and D4 are respectively configured to the sensing circuit 510 and the independent light source circuit 511 (i.e. the data line D4 is configured to the independent light source circuit 511 to control the light intensity of the independent light source circuit 511 and the data line D5 is configured to the sensing circuit 510 to receive and transmit the signals of the sensing circuit 510). The scan line S21 is configured to the sub-pixels RGB of the pixel P2 and the scan line S22 is configured to the sensing circuit 520 and the independent light source circuit 521. Data line D5 and data line D4 are respectively configured to the sensing circuit 520 and the independent light source circuit 521 (i.e. data line D4 is configured to the independent light source circuit 521 to control the light intensity of the independent light source circuit 521, and data line D5 is configured to the sensing circuit 520 to receive and transmit the signals of the sensing circuit 510). Therefore, in the embodiment of the disclosure, the sub-pixels RGB of pixel P1 and the sensing circuit 510 may be driven by the respective scan lines S11 and S12 at the same time or at different times, and sub-pixels RGB of pixel P2 and the sensing circuit 520 may be respectively driven by the scan lines S21 and S22 at the same time or at different times. Note that, in order to clarify the concept of the disclosure, FIG. 5 merely presents one embodiment of the disclosure. However, the disclosure should not be limited to what is shown in FIG. 5. In other embodiments of the disclosure, the sensing circuit 510 may share the same scan line with the sub-pixels RGB of pixel P1 and the sensing circuit 520 may share the same scan line with the sub-pixels RGB of pixel P2.

In an embodiment of the disclosure, when biometric recognition is performed by the display panel 100, the control circuit 130 may perform biometric recognition according to the different threshold voltages Vth of the different sensing circuits, wherein the different threshold voltages Vth are generated by the different intensity of the sensed lights of the different sensing circuits (FIGS. 6A-6B will be used below as an example to illustrate the embodiment). Specifically, when the TFT is illuminated by the light, an offset of threshold voltage Vth will occur, and when the intensity of the light is greater, the offset of the threshold voltage is bigger. Therefore, the control circuit 130 may perform biometric recognition according to the different threshold voltages Vth generated by the different sensing circuits according to the different intensity of the sensed lights of the different sensing circuits and the operation properties (the TFT is turned on when Vgs-Vth>0) of the TFT.

Figure 6A:
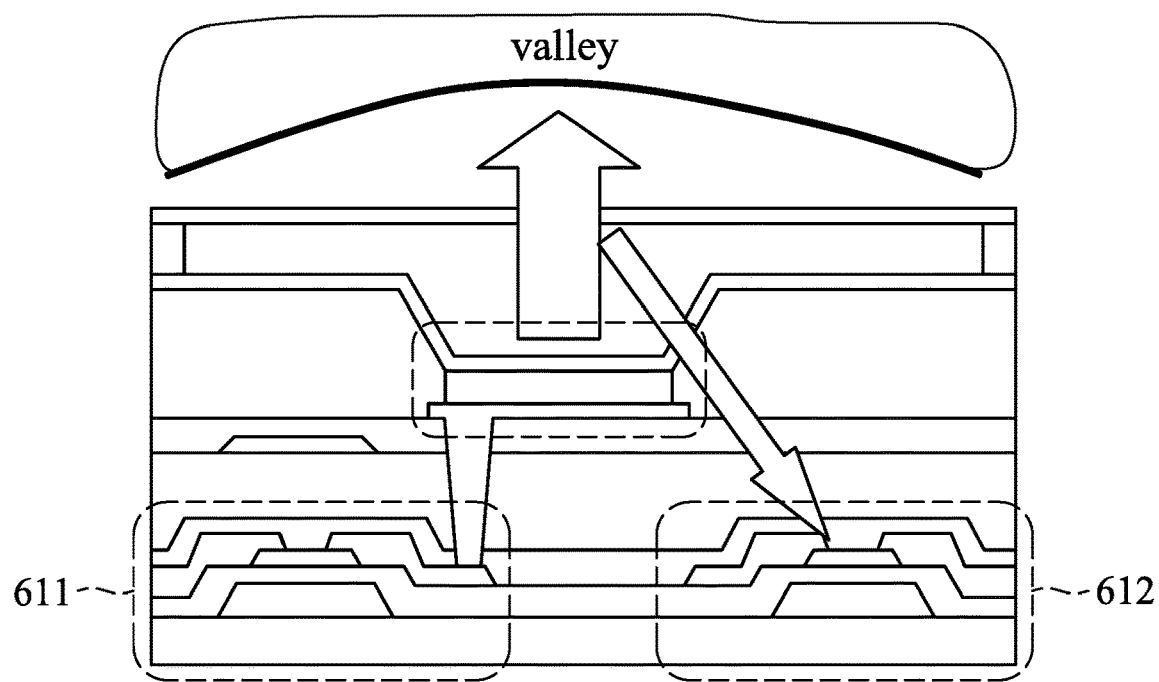
FIG. 6A is a schematic diagram of the amount of reflected light of the valley of the biometric according to an embodiment of the disclosure.

FIG. 6A is a schematic diagram of the amount of reflected light of the valley of the biometric according to an embodiment of the disclosure. As shown in FIG. 6A, the self-luminous display (e.g. OLED and Micro LED) is used as an example. When the light generated by the emitting device 611 (e.g. the sub-pixel or independent light source circuit) is emitted to the valley of the biometric, because the amount of reflected (or scattered) light is less, the intensity of the light sensed by the sensing circuit 612 is weaker and the offset of the threshold voltage is smaller.

Figure 6B:
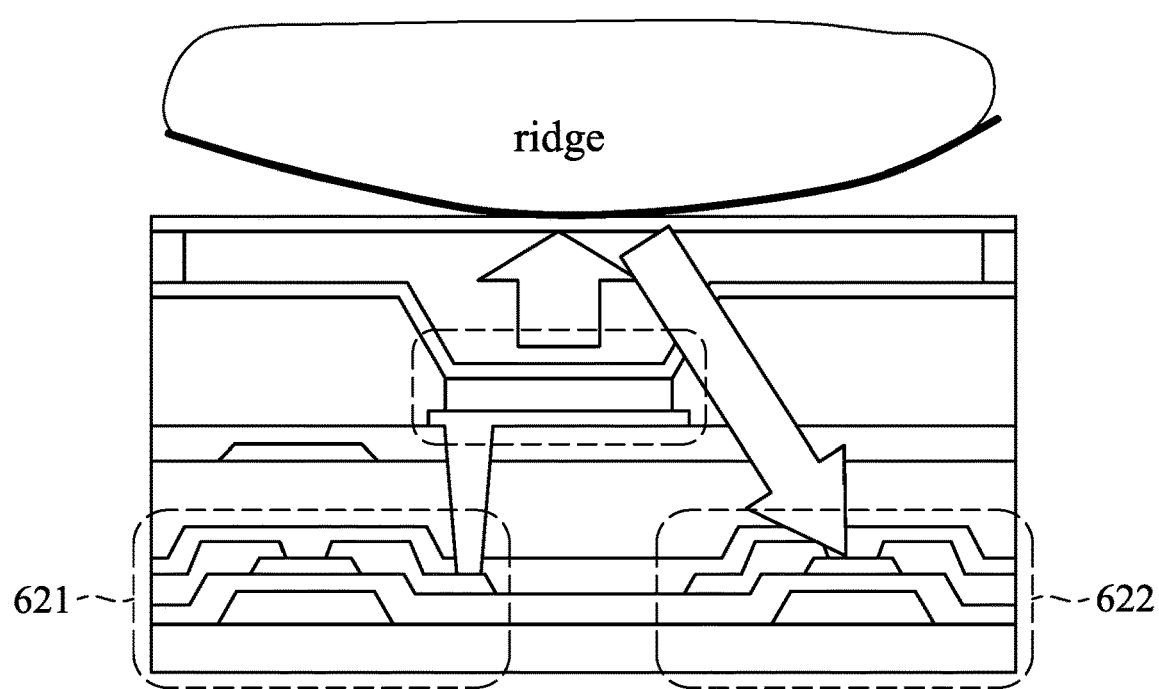
FIG. 6B is a schematic diagram of the amount of reflected light of the ridge of the biometric according to an embodiment of the disclosure.

FIG. 6B is a schematic diagram of the amount of reflected light of the ridge of the biometric according to an embodiment of the disclosure. As shown in FIG. 6B, the self-luminous display (e.g. OLED and Micro LED) is used as an example. When the light generated by the emitting device 621 (e.g. the sub-pixel or independent light source circuit) is emitted to the ridge of the biometric, because the amount of reflected (or scattered) light is greater, the intensity of the light sensed by the sensing circuit 622 is larger and the offset of the threshold voltage is bigger.

Therefore, as shown in FIGS. 6A and 6B, the control circuit 130 may perform biometric recognition according to the variance of the threshold voltage. Note that, in FIGS. 6A and 6B, a self-luminous display is used as an example, but the disclosure should not be limited thereto. A non-self-luminous display (e.g. LCD) can also be applied in the above embodiment.

In the embodiments of the disclosure, different types of sensing circuits may have different circuit structures. Therefore, for different types of sensing circuits, the control circuit 130 may calculate the variance of a parameter (i.e. different parameters may respectively correspond to different types of sensing circuits) according to the type of sensing circuit, and perform biometric recognition according to the variance.

Figure 7:
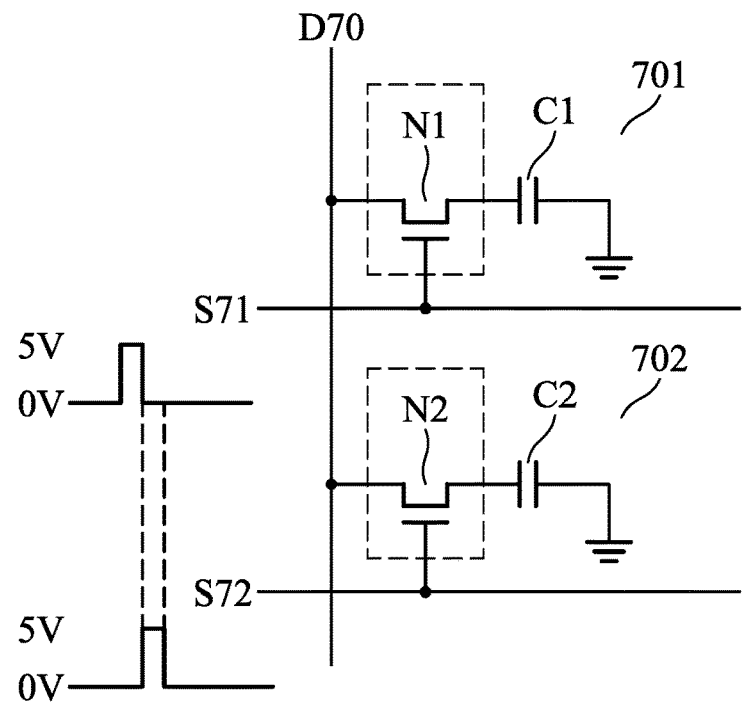
FIG. 7 is a schematic diagram of the electric-charge-type sensing circuit architecture 700 according to an embodiment of the disclosure.

In an embodiment of the disclosure, when the control circuit 130 performs biometric-recognition according to the different threshold voltages Vth of the different sensing circuits and the operation properties (the TFT is turned on when Vgs-Vth>0) of the TFT, the control circuit 130 may calculate the variance of the electric charges (i.e. the parameter corresponding to the sensing circuit) to perform biometric recognition. FIG. 7 will be used to illustrate the embodiment below.

FIG. 7 is a schematic diagram of electric-charge-type sensing circuit architecture 700 according to an embodiment of the disclosure. As shown in FIG. 7, the electric-charge-type sensing circuit 701 comprises a first transistor N1 and a first capacitor C1 and the electric-charge-type sensing circuit 702 comprises a second transistor N2 and a second capacitor C2, wherein the dotted part of FIG. 0.7 presents the TFT elements (i.e. the first transistor N1 and the second transistor N2) which are illuminated by the light in the electric-charge-type sensing circuit 701 and the electric-charge-type sensing circuit 702. In the embodiment of the disclosure, the signals input into the electric-charge-type sensing circuit 701 and the electric-charge-type sensing circuit 702 and the signals output from the electric-charge-type sensing circuit 701 and the electric-charge-type sensing circuit 702 may be transmitted through the same data line D70. When the first transistor N1 is illuminated by the light, the threshold voltage of the first transistor N1 is Vth1 and when second transistor N2 is illuminated by the light, the threshold voltage of the second transistor N2 is Vth2. Therefore, if the electric-charge capacity of the first capacitor C1 and the second capacitor C2 is Cfp and the pulse voltage input to the electric-charge-type sensing circuit 701 and the electric-charge-type sensing circuit 702 is 5V, the electric charge Q1 and electric charge Q2 respectively stored in the first capacitor C1 and the second capacitor C2 may be obtained using the following formulas:

$$Q1 = Cfp*(5-Vth1)$$

$$Q2 = Cfp*(5-Vth2)$$

After the electric charge Q1 and electric charge Q2 respectively stored in the first capacitor C1 and the second capacitor C2 are obtained, the control circuit 130 may calculate the variance of the electric charges Q1 and Q2 (i.e. $\Delta Q = Cfp*(Vth1-Vth2)$).

Figure 8:
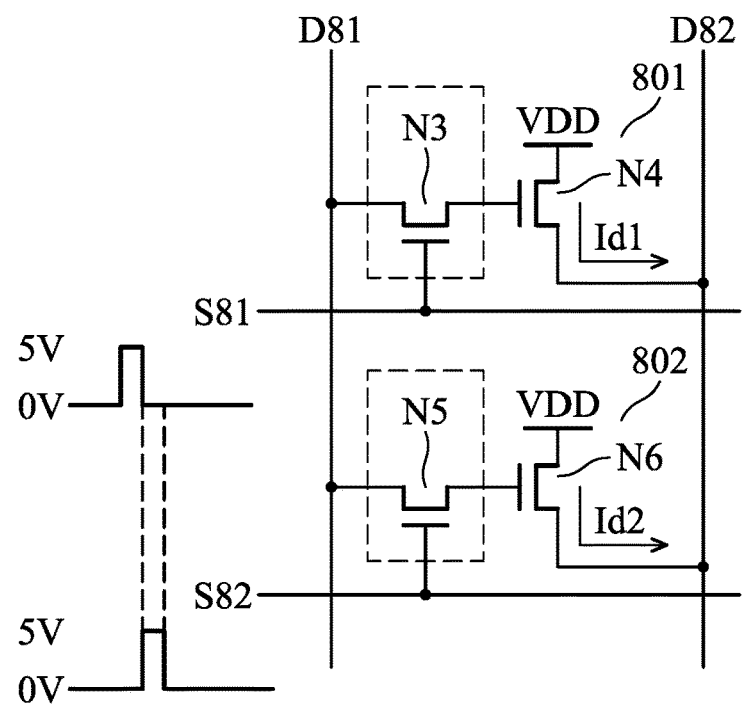
FIG. 8 is a schematic diagram of the current-type sensing circuit architecture 800 according to an embodiment of the disclosure.

In another embodiment of the disclosure, when the control circuit 130 performs biometric-recognition according to the different threshold voltages Vth of the different sensing circuits and the operation properties (the TFT is turned on when Vgs-Vth>0) of the TFT, the control circuit 130 may calculate the variance of the current (i.e. the parameter corresponding to the sensing circuit) to perform biometric recognition. FIG. 8 will be used to illustrate the embodiment below.

FIG. 8 is a schematic diagram of the current-type sensing circuit architecture 800 according to an embodiment of the disclosure. As shown in FIG. 8, the current-type sensing circuit 801 comprises a third transistor N3 and a fourth transistor N4 and the current-type sensing circuit 802 comprises a fifth transistor N5 and a sixth transistor N6. The third transistor N3 is electrically connected to the fourth transistor N4 and the fifth transistor N5 is electrically connected to the sixth transistor N6, wherein the dotted part of FIG. 0.8 presents the TFT elements (i.e. the third transistor N3 and the fifth transistor N5) which are illuminated by the light in the current-type sensing circuit 801 and the current-type sensing circuit 802. In the embodiment of the disclosure, a light-shielding layer is utilized to avoid that the fourth transistor N4 and the sixth transistor N6 are illuminated by the light, as a result, the offsets of the threshold voltages Vth of the fourth transistor N4 and the sixth transistor N6 are not occurred. In the embodiment of the disclosure, the signals input into the current-type sensing circuit 801 and the current-type sensing circuit 802 and the signals output from the current-type sensing circuit 801 and the current-type sensing circuit 802 may be respectively transmitted through different data lines D81 and D82. When the third transistor N3 is illuminated by the light, the threshold voltage of the third transistor N3 is Vth1 and when fifth transistor N5 is illuminated by the light, the threshold voltage of the fifth transistor N5 is Vth2. The threshold voltage Vth1 and the threshold voltage Vth2 can be regarded as the gate signals of the fourth transistor N4 and the sixth transistor N6, respectively. Therefore, if the pulse voltage input to the current-type sensing circuit 801 and the current-type sensing circuit 802 is 5V and the threshold voltages of the fourth transistor N4 and the sixth transistor N6 are Vth, the saturation current Id1 of the fourth transistor N4 and the saturation current Id2 of the sixth transistor N6 may be obtained using the following formulas:

$$Id1 = K*[(5-Vth1)-Vth]$$

$$Id2 = K*[(5-Vth2)-Vth],$$

wherein the (5−Vth1) is regarded as the Vgs of the fourth transistor N4 and the (5−Vth2) is regarded as the Vgs of the sixth transistor N6. After the saturation current Id1 of the fourth transistor N4 and the saturation current Id2 of the sixth transistor N6 are obtained, the control circuit 130 may calculate the variance of the current (i.e. ΔId=Id1−Id2).

Figure 9:
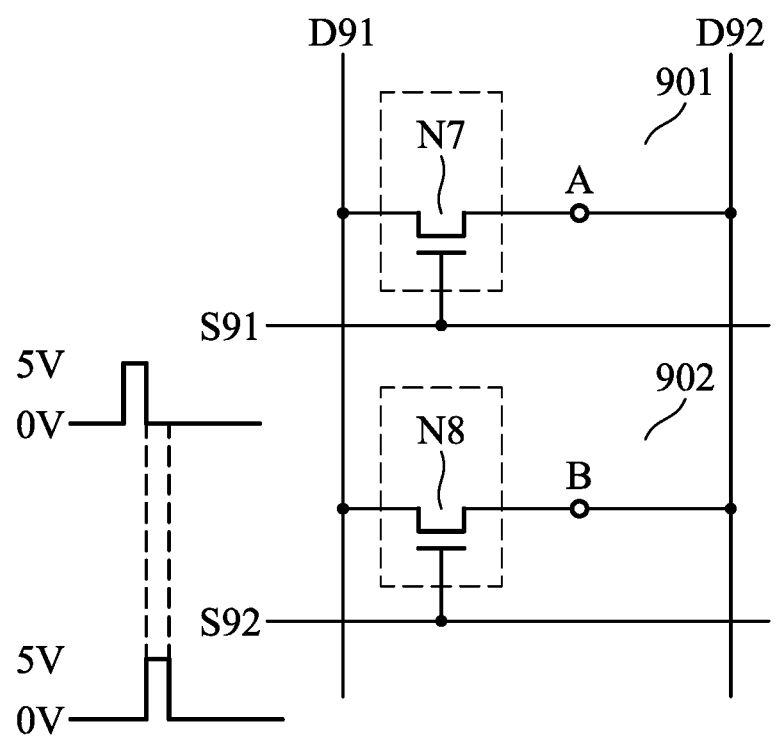
FIG. 9 is a schematic diagram of the voltage-type sensing circuit architecture 900 according to an embodiment of the disclosure.

In another embodiment of the disclosure, when the control circuit 130 performs biometric-recognition according to the different threshold voltages Vth of the different sensing circuits and the operation properties (the TFT is turned on when Vgs−Vth>0) of the TFT, the control circuit 130 may calculate the variance of the voltage (i.e. the parameter corresponding to the sensing circuit) to perform biometric recognition. FIG. 9 will be used to illustrate the embodiment below.

FIG. 9 is a schematic diagram of the voltage-type sensing circuit architecture 900 according to an embodiment of the disclosure. As shown in FIG. 9, the voltage-type sensing circuit 901 comprises a seventh transistor N7 and the voltage-type sensing circuit 902 comprises a eighth transistor N8, wherein the dotted part of FIG. 9 presents the TFT elements (i.e. the seventh transistor N7 and the eighth transistor N8) which are illuminated by the light in the voltage-type sensing circuit 901 and the voltage-type sensing circuit 902. In the embodiment of the disclosure, the signals input into the voltage-type sensing circuit 901 and the voltage-type sensing circuit 902 and the signals output from the voltage-type sensing circuit 901 and the voltage-type sensing circuit 902 may respectively be transmitted through different data lines D91 and D92. When the seventh transistor N7 is illuminated by the light, the threshold voltage of the seventh transistor N7 is Vth1 and when eighth transistor N8 is illuminated by the light, the threshold voltage of the eighth transistor N8 is Vth2. Therefore, if the pulse voltage input to the voltage-type sensing circuit 901 and the voltage-type sensing circuit 902 is 5V, the voltage V1 of the point A of the voltage-type sensing circuit 901 and the voltage V2 of the point B of the voltage-type sensing circuit 902 may be obtained using the following formulas:

$$V1=5-Vth1$$

$$V2=5-Vth2$$

After the voltage V1 of the point A of the voltage-type sensing circuit 901 and the voltage V2 of the point B of the voltage-type sensing circuit 902 are obtained, the control circuit 130 may calculate the variance of the voltage (i.e. ΔV=Vth1−Vth2). Note that, in above embodiments of the disclosure, the 5V pulse voltage is only used as an example, but the disclosure is not limited thereto. The value of the pulse voltage can be adjusted according to different requirements.

Specifically, in order to clarify the concepts of the disclosure, FIGS. 7-9 only present parts of the sensing circuits (i.e. The part of the pixels is omitted). However, the disclosure should not be limited to what is shown in FIGS. 7-9. In addition, in FIGS. 2-5, electric-charge-type sensing circuit is adopted, but the disclosure should not be limited thereto. That is to say, the different types of sensing circuit architectures shown in FIG. 7-9 can be applied to the different configurations of the sensing circuits in different embodiments of the disclosure.

According to the biometric-recognition display panel provided in the embodiments of the disclosure, the intensity of the output signal of the sensing circuit can be promoted by configuring the sensing circuit in the pixel without needing to use the driving chip with high specification to read the output signal will be reduced. In addition, when the TFT is illuminated by the light, an offset of threshold voltage Vth of the TFT will occur, and when Vgs−Vth>0 the TFT is turned on, therefore, the biometric-recognition display panel provided in the disclosure can perform biometric recognition according to the properties of the TFT, i.e. the biometric-recognition display panel can perform biometric recognition according to the variance of the threshold voltage Vth. Therefore, the biometric-recognition display panel provided in the disclosure can generate the high resolution or high intensity output signal. In addition, the biometric-recognition display panel provided in the disclosure can be configured with different types of sensing circuits to increase the flexibility of the arrangement with the display and display driving chip.

Reference throughout this specification to "one embodiment" or "an embodiment" means that a particular feature, structure, or characteristic described in connection with the embodiment is included in at least one embodiment of the disclosure, but do not denote that they are present in every embodiment. Thus, the appearances of the phrases "in one embodiment" or "in an embodiment" in various places throughout this specification are not necessarily referring to the same embodiment of the disclosure Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The above paragraphs describe many aspects. Obviously, the teaching of the disclosure can be accomplished by many methods, and any specific configurations or functions in the disclosed embodiments only present a representative condition. Those who are skilled in this technology will understand that all of the disclosed aspects in the disclosure can be applied independently or be incorporated.

While the disclosure has been described by way of example and in terms of embodiment, it is to be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A biometric-recognition display panel, comprising:
a substrate, comprising a display area;
a pixel array, disposed on the display area and comprising a plurality of pixels;
a plurality of sensing circuits, disposed on the display area and each of the sensing circuits generates a threshold voltage by sensing intensity of light; and
a control circuit, performing biometric recognition according to each of the threshold voltages generated by each of the sensing circuits,
wherein each of the pixels comprises:
one of the sensing circuits;
an independent light source circuit; and
a plurality of sub-pixels, wherein each of the sub-pixels is coupled to a respective data line, wherein the one of the sensing circuits is configured outside the plurality of sub-pixels, wherein the independent light source circuit is independent of the plurality of sub-pixels, and wherein a scan line is configured to connect to the one of the sensing circuits and connect to the independent light source circuit, and wherein the independent light source circuit and the one of the sensing circuits are connected to the same scan line, wherein the independent light source circuit provides a light source to the one of the sensing circuits, wherein the light source includes an invisible light, wherein the invisible light include ultraviolet light, far infrared light, or near infrared light.

2. The biometric-recognition display panel of claim 1, wherein each of the sensing circuits corresponds to a respective pixel of the pixels, and one of the plurality of pixels and a sensing circuit of the sensing circuits corresponding to the one of the plurality of pixels are coupled to a scan line.

3. The biometric-recognition display panel of claim 1, wherein the sensing circuits respectively corresponds to the pixels, and one of the pixels and a sensing circuit of the sensing circuits corresponding to the one of the plurality of pixels are coupled to different scan lines respectively.

4. The biometric-recognition display panel of claim 1 further comprising:

a non-display area, disposed outside the display area, wherein the control circuit is disposed in the non-display area, and outside the display area.

5. The biometric-recognition display panel of claim 1, wherein the biometric-recognition display panel can be a non-self-luminous display or a self-luminous display.

* * * * *